(12) United States Patent
Goshima et al.

(10) Patent No.: US 8,302,557 B2
(45) Date of Patent: Nov. 6, 2012

(54) DEVICE AND METHOD FOR COATING BASE MATERIAL

(75) Inventors: Tomoyuki Goshima, Shizuoka (JP);
Shigeji Matsumoto, Shizuoka (JP);
Kosuke Shinomiya, Shizuoka (JP)

(73) Assignee: Cataler Corporation, Shizouka (JP)

( * ) Notice: Subject to any disclaimer, the term of this patent is extended or adjusted under 35 U.S.C. 154(b) by 841 days.

(21) Appl. No.: 11/917,409

(22) PCT Filed: Jul. 7, 2005

(86) PCT No.: PCT/JP2005/012555
§ 371 (c)(1),
(2), (4) Date: Sep. 17, 2008

(87) PCT Pub. No.: WO2007/007370
PCT Pub. Date: Jan. 18, 2007

(65) Prior Publication Data
US 2009/0155475 A1    Jun. 18, 2009

(51) Int. Cl.
*B05C 3/04* (2006.01)
(52) U.S. Cl. ......... 118/410; 118/55; 118/107; 118/111; 118/232; 118/318; 118/416; 427/232; 427/238; 427/240; 427/295; 427/346; 427/430.1; 502/527.19
(58) Field of Classification Search .......... 427/346, 427/421.1, 235, 238, 294, 430.1, 443.2, 239, 427/295, 481, 72, 183, 230, 2, 31, 425, 240, 427/289, 290; 118/612, 52, 55, 56, 57, 107, 118/111, 112, 232, 318, 409, 410, 416; 502/4, 502/527.19
See application file for complete search history.

(56) References Cited

U.S. PATENT DOCUMENTS
5,077,093 A * 12/1991 Baumgartner et al. ....... 427/294
(Continued)

FOREIGN PATENT DOCUMENTS
GB    1507168    4/1978
(Continued)

OTHER PUBLICATIONS
English language Abstract of JP 2000-084417, Mar. 28, 2000.
(Continued)

*Primary Examiner* — Michael Cleveland
*Assistant Examiner* — Alexander Weddle
(74) *Attorney, Agent, or Firm* — Greenblum & Bernstein P.L.C.

(57) ABSTRACT

A device and a method which is capable of uniformly coating, without waste, any flow passages formed in a raw material with a slurry even if a slurry having high viscosity is fed thereto by an amount required for the use of coating without excess and shortage. When the slurry (S) fed to one end of the base material (M) in which a large number of flow passages (2 . . . ) are formed parallel with each other is forced into the flow passages (2 . . . ) by an air pressure to coat the inner walls (2w) of the flow passages, the slurry (S) is fed from a slurry feeding device (6) by a required amount to a slurry storage part (5) formed at the upper surface part of the base material (M) disposed so that both ends of the flow passages (2 . . . ) can be opened in the upper and bottom surfaces thereof. Then, before the slurry (S) is forced into the flow passages (2 . . . ), a centrifugal force and vibration are allowed to act on the slurry (S) by a liquid level uniformalizing mechanism (7) to uniformalize the level of the slurry.

4 Claims, 6 Drawing Sheets

U.S. PATENT DOCUMENTS

| | | |
|---|---|---|
| 6,599,570 B1 | 7/2003 | Aderhold et al. |
| 6,627,257 B1 * | 9/2003 | Foerster et al. ............... 427/235 |
| 2001/0026838 A1 * | 10/2001 | Dettling et al. ............... 427/230 |
| 2007/0128354 A1 | 6/2007 | Suzuki et al. |

FOREIGN PATENT DOCUMENTS

| | | |
|---|---|---|
| JP | 51-128691 | 11/1976 |
| JP | 60-216848 | 10/1985 |
| JP | 63-051949 | 3/1988 |
| JP | 2000-084417 | 3/2000 |
| JP | 2000-202304 | 7/2000 |
| JP | 2002-506720 | 3/2002 |
| JP | 2002-347701 | 12/2002 |

OTHER PUBLICATIONS

English language Abstract of JP 2000-202304, Jul. 25, 2000.
English language Abstract of JP 2002-347701, Dec. 4, 2002.
English language Abstract of JP 60-216848, Oct. 30, 1985.
English language Abstract of JP 63-051949, Mar. 5, 1988.

* cited by examiner

DEVICE AND METHOD FOR COATING BASE MATERIAL

TECHNICAL FIELD

The present invention concerns a device and a method for coating a substrate by spreading a slurry in a plurality of flow channels formed in parallel with each other to a substrate and coating the inner wall of the flow channels thereof and it is particularly suitable to coating of a catalyst slurry to the inner wall of a honeycomb channel formed to a monolith as a catalyst substrate for an exhaust gas purifying catalyst to form a catalyst.

BACKGROUND ART

A wash coat method has been known as a method of coating a catalyst slurry on the inner wall of the honeycomb channels formed to a monolith as a catalyst substrate.
Patent Document 1: JP-A No. 63-51949
Patent Document 2: JP-W 2002-506720

FIG. 5 shows a coating device by the existent wash coat method, in which a slurry S is supplied from a slurry supplying device 53 to a storing part 52 formed on the side of the upper end of a monolith M disposed such that honeycomb channels 51 - - - are opened at upper and lower ends, and the slurry is caused to flow into and spread in the flow channels 51 by supplying a pressurized air on the side of the upper end or sucking air on the side of the lower end to coat the inner wall of the channels 51.

Recently, a noble metal such as platinum is sometimes contained in the slurry S and the slurry S by a necessary amount used for coating the monolith M to the storing part 52.

By the way, since some slurry S has a high viscosity, the slurry supply nozzle 54 is necessary to have a diameter to some extent but it is desirably as small as possible for strictly controlling the supply amount. Then, when a slurry at a high viscosity is supplied from the supply nozzle 54 to the storing part 52, the slurry S is stored in a state raised at a portion just beneath the supply nozzle 54 (refer to FIG. 6(a)).

When a pressurized air is supplied from the upper end or air is sucked from the lower end in this state, the slurry S initially flows inward uniformly in each of the channels 51 - - - (refer to FIG. 6(b)).

Since the amount of the slurry S is large in the central portion and small in the peripheral portion, even after the slurry S at the peripheral portion has been caused to flow downward completely into the honeycomb channels 51A at the peripheral portion, the slurry still flows downward in the honeycomb channels 51B at the central portion.

Then, when the slurry is finally spread and coated in the honeycomb channels 51 by sucking air on the side of the lower end, the coating length for the honeycomb channels 51B in the central part is longer than the coating length in the honeycomb channels 51A at the peripheral part (refer to FIG. 6(c)).

Accordingly, in a case, for example, of supplying a slurry in a required amount intending to coat the slurry S by one-half length of the honeycomb channels 51, the honeycomb channels 51A at the peripheral part are coated only by the one-half length or less, whereas the honeycomb channels 51B at the central part are coated by one-half length or more to make the coating length not uniform.

In the same manner, in a case of supplying the slurry S by a necessary amount used for coating the monolith M, since a sufficient amount of the slurry S does not flow downward in the honeycomb channels 51A at the peripheral part, the honeycomb channels 51A are not coated as far as the lower end, whereas excess slurry S flows out from the honeycomb channels 51B at the central part (refer to Fig. (d)).

Accordingly, in order to coat the slurry S uniformly over the entire length for each of the honeycomb channels 51, it has to be used inevitably a method of supplying the slurry S in a much more amount than the necessary amount used for coating the monolith M to the storing part 52, filling the slurry S excessively in all the honeycomb channels 51 and cleaning off the surplus slurry S. Then, the cleaned off surplus slurry S has to be recovered, re-conditioned for the ingredient and recycled, and this results in troubles by so much.

DISCLOSURE OF THE INVENTION

Subject to be Solved by the Invention

In view of the above, it is a technical subject of the present invention that a slurry, when supplied by a necessary amount used for coating with no excess of insufficiency, it can be coated uniformly with no wasteful loss for any of the channels formed in the substrate.

Means for the Solution of the Subject

The present invention provides a substrate coating device by spreading a slurry supplied on one end of a substrate in which a plurality of flow channels are formed in parallel with each other in the flow channels by an air pressure thereby coating the inner wall of the flow channels, including the slurry supplying device for supplying a slurry by a necessary amount to a slurry storing part formed above the upper surface of the substrate in which both ends of the channels are opened at the upper surface and the bottom surface, and a liquid surface levelling mechanism for levelling the liquid surface of the slurry before spreading the slurry into the flow channels.

Effect of the Invention

According to the substrate coating device of the invention, the slurry is supplied by a necessary amount from the slurry supplying device to the slurry storing part formed above the upper surface of the substrate in which the flow channels are arranged such that the both ends thereof are opened to the upper surface and the bottom surface, the liquid surface of the slurry is levelled by the liquid surface levelling mechanism and then the slurry is spread in the flow channels.

That is, the slurry supplied from the slurry supplying device is raised at the instance in a convex shape in the slurry storing part but the slurry liquid surface is levelled before spreading the slurry into the flow channels by the liquid surface levelling mechanism, for example, by rotating the substrate around a vertical axis passing therethrough, or vibrating the stored slurry.

As described above, after the liquid surface is levelled in the storing part, when the slurry is caused to flow to the respective channels by acting a pressurized air from the upper end or sucking air from the lower end and, optionally, conducting pressurization and sucking at the same time, since the positions for the liquid surface to the respective channels are equal at that time, an identical amount of slurry is caused to flow into each of the channels.

Accordingly, in a case of intending to coat the slurry, for example, over the entire length for each of the channels, even when the slurry is supplied by a just mount necessary for use in coating to the storing part, since an appropriate amount of the slurry is caused to flow into and spread in each of the channels, the slurry can be coated over the entire length for each of the channels.

Further, while a slurry generally has such an extent of viscosity as not flowing into the channels as it is, some slurry has a low viscosity to such an extent as flowing into the flow channels only by the gravitational force.

In a case of using such a slurry, an air pressure control mechanism may be provided for switching inhibition of the inflow or extension of the slurry into the flow channel by controlling the gravitational force of the slurry tending to flow from the slurry storing part to each of the channels and the air pressure in the flow channels such that the slurry does not flow into each of the channels before levelling the liquid surface.

As the air pressure control mechanism, an air handling device of supplying/sucking air on the side of the bottom of the substrate to exert a positive pressure/negative pressure into each of the channels is used, or an air handling device having a detachable packing for tightly sealing the channel opening on the side of the bottom of the substrate and sucking air in the flow channel and/or supplying a pressurized air on the side of the liquid surface of the slurry storing part in a state of opening the packing is used.

BEST MODE FOR CARRYING OUT THE INVENTION

In this embodiment, a subject for enabling to flow a slurry at a high viscosity uniformly with no waste to any of the channels and conducting coating has been attained by a simple constitution.

FIG. 1 is an explanatory view showing an example of a substrate coating device according to the invention, FIG. 2 is a step chart showing an example of a substrate coating method according to the invention, and FIG. 3 and FIG. 4 are explanatory views showing other embodiments.

The substrate coating device 1 shown in FIG. 1 is used for flowing and spreading a catalyst slurry S by an air pressure into a plurality of honeycomb channels 2 - - - formed in parallel with each other in a monolith (catalyst substrate) M and coating the inner wall 2w of the honeycomb flow channels thereby manufacturing an exhaust gas purifying catalyst.

The substrate coating device 1 includes a device main body 3 for fixing a monolith M such that both ends of the honeycomb channels 2 - - - are opened to the upper surface and the bottom surface, a slurry supplying device 6 for supplying a slurry S by a necessary amount to a slurry storing part 5 in which an attachment 4 is mounted to the upper end of the monolith M, a liquid surface levelling mechanism 7 for levelling the liquid surface of the slurry, and an air pressure control mechanism 8 for controlling the gravitational force of the slurry S tending to flow into each of the flow channels 2 - - - from the slurry storing part 5 and the air pressure in the flow channels 2 - - - thereby switching the inhibition of inflow and spreading of the slurry S to the flow channels 2 - - - .

In the device main body 3, the ceiling surface of an air chamber 9 controlled for the inner pressure by the air pressure control mechanism 8 is formed with a rotary table (substrate rotational mechanism) 10 capable of rotationally supporting the monolith M.

The rotary table 10 is adapted such that the monolith M can be mounted rotationally around a vertical axis passing therethrough by meshing between gear teeth 10a formed to the outer peripheral surface thereof and gear teeth 12a of a drive gear 12 driven by a motor 11, to constitute a liquid surface levelling mechanism 7 for levelling the liquid surface of the slurry by utilizing a centrifugal force by rotation in a state of storing the slurry S in the slurry storing part 5.

The monolith M is fixed being fitted into a perforation hole 10b formed in the rotary table 10 such that the honeycomb channels 2 - - - are opened at the upper end to the outside of the air chamber 9 and opened at the lower end into the air chamber 9.

The attachment 4 as the slurry storing 5 is fitted at the lower end thereof which is formed in a shape and a size identical with those of the upper end surface of the monolith M and formed as a frust conical plane gradually expanded toward the upper end thereof.

The slurry supplying device 6 is set such that the slurry S of a predetermined amount is accurately measured and supplied.

The air pressure control mechanism 8 uses an air handling device 13 for supplying/sucking air thereby exerting positive pressure/negative pressure into each of the channels 2 - - - and, more specifically, includes an air pump 14 for sucking and discharging air and a switching valve CV for switching supply/suction of air to the air chamber 9.

Then, the switching valve CV comprises a 3-position valve for switchingly connecting a suction side 14 in and a discharge side 14 out of the air pump 14 to an atmospheric air opening port 15 and a supply/exhaust pipe 16, and is adapted to supply air sucked from the atmospheric air opening port 15 into the air chamber 9 to exert a positive pressure to the flow channels 2 - - - at first portion P1, shut the supply/exhaust pipe 16 at a second position $P_2$, maintain the inner pressure of the air chamber 9, and forcively discharge air in the air chamber 9 to exert a negative pressure on the flow channels 2 - - - at a third position $P_3$.

Further, a relief valve 18 is intervened in a pipeline 17 branched from the supply/discharge pipe 16 and adapted to be opened when the inner pressure of the air chamber 9 exceeds a set pressure to release the inner air and keep the inner pressure to the set pressure.

An example of the constitution of the invention is as has been described above, and description is to be made to a case of coating a slurry to the catalyst substrate by a substrate coating method according to the invention.

At first, in a state of mounting the attachment 4 to the monolith M as the catalyst substrate, this is fixed to the rotary table 10.

In the slurry supply step as shown in FIG. 2(a), the slurry S by a necessary minimum amount used upon coating the slurry S over the entire length of the honeycomb channels 2 - - - is supplied from the slurry supplying device 6 to the slurry storing part 5. Since the slurry S has a viscosity to some extent, it is in a state raised in the slurry storing part 5.

Simultaneously, when the switching valve CV of the air pressure control mechanism 8 is set to the first position $P_1$, air is supplied into the air chamber 9 to exert a positive pressure to each of the channels 2 - - - to such an extent as the slurry S does not flow into the honeycomb channels 2 - - - and then the switching valve CV is set to the second position $P_2$, a positive pressure in each of the channels 2 - - - is maintained even when the air pump 14 is stopped.

Then, in the liquid surface levelling step, as shown in FIG. 2(b), when the rotary table 10 of the liquid surface levelling mechanism 7 is rotated at an appropriate number of rotation, the monolith M and the attachment 4 mounted to the upper end thereof are rotated, in which a centrifugal force exerts on the slurry S stored in the slurry storing part 5 and the slurry S raised in the central part extends to the periphery.

Then, at the instance the liquid surface is levelled, substantially, the rotation of the rotary table 10 is stopped.

Meanwhile, since the inside of the honeycomb channels 2 - - - is kept at the positive pressure, the slurry S does not flow inward.

Then, in the slurry spreading step, air in the air chamber 9 is sucked by setting the switching valve CV of the air pressure control mechanism 8 to the third position $P_3$ to flow the slurry S into the honeycomb channels 2 - - - as shown in FIG. 2(c).

In this instance, since the liquid surface is uniform (horizontal), the slurry S flows equally to each of the channels 2 - - - and, when all the slurry S stored in the storing part 5 flow into each of the channels, the slurry S is filled in each of the channels 2 - - - each for an identical length as shown in FIG. 2(d).

Further, when air in the air chamber 9 is sucked, the slurry S filled in each of the channels 2 - - - is spread along the inner wall 2w of the channel and, since the slurry S has been initially supplied by a necessary minimum amount that can coat the entire length of all the honeycomb channels 2 - - -, the entire length is coated equally both in the honeycomb channels 2A for the peripheral part and the honeycomb channels 2B for the central part of the monolith M as shown in FIG. 2(e).

This is not restricted restrict to a case of coating the entire length and, for example, in a case of coating a predetermined length such as ½ or ⅔ for the entire length, the supply amount of slurry to the slurry storing part 5 may be adjusted in accordance with the coating length.

FIG. 3 shows another embodiment of the invention. In this embodiment, upon levelling the liquid surface of slurry, a centrifugal force is not exerted but vibrations are exerted. Portions identical with those in FIG. 1 carry identical references for which detailed descriptions are to be omitted.

In a substrate coating device 21 of this embodiment, a table 23 for fixing a monolith M such that both ends of the honeycomb channels 2 - - - are opened to the upper surface and the bottom surface is disposed to the ceiling surface of the device main body 22 provided with an air chamber 9 in which the inner pressure is controlled by a air pressure control mechanism 8.

A liquid surface levelling mechanism 7 includes a vibrator (vibration mechanism) 24 attached to the outer peripheral surface of an attachment 4 mounted to the upper end of the monolith M, so that the liquid surface of the slurry S stored in a convexed state is levelled for the by vibration, for example, by low frequency oscillation, high frequency oscillation, and ultrasonic oscillation.

The vibrator 24 may be attached to the device main body 22 and, in summary, it may be adapted such that vibrations are transmitted to the slurry S stored in the slurry storing part 5.

FIG. 4 shows a further embodiment. In this embodiment, air pressure can be controlled without supplying air to the honeycomb channels 2 - - - . Portions common with those in FIG. 1 carry identical references for which detailed descriptions are to be omitted.

A substrate coating device 31 in this embodiment uses an air handling device 34 having a detachable packing 32 that tightly seals the opening of the honeycomb channels 2 - - - on the side of the bottom, and an air pump 33 for sucking air in the honeycomb channels 2 - - - by way of an air chamber 9 in a state of opening the packing 32 as an air pressure control mechanism 8.

To the packing 32, a lift base 35 disposed vertically movably in the air chamber 9 is attached rotationally to a lifting shaft 36, and a soft rubber 38 is disposed by way of a sponge-like elastic member 37 on the surface of the base 35, to tightly seal the opening of the honeycomb channel 2 - - - by the soft rubber 38.

With the constitution, when the packing 32 is in intimate contact with the monolith M to close the opening on the bottom of the flow channel 2 in the slurry supply step and the liquid surface levelling step, even when the slurry supplied in the slurry storing part 5 tends to flow into the honeycomb channels 2 - - -, inflow of the slurry S is reliably inhibited by the pressure of air confined in each of the channels 2.

Then, in the slurry spreading step, when the air pump 33 of the air handling device 34 is actuated after lowering the packing 32, air in the honeycomb channels 2 is sucked by way of the air chamber 9 and the slurry S flows uniformly to each of the honeycomb channels 2 - - - .

Further, in the foregoings, while description has been made to a case of sucking air in the honeycomb channels 2 - - - by way of the air chamber 9 using the air handling device 13 or 34 in any of the slurry spreading steps, the invention is not restricted only thereto but it may be applied to the case of supplying the pressurized air on the side of the liquid surface of the slurry storing part 5, or to a case of conducting both of them.

Further, while description has been made to the case of coating the catalyst slurry to the monolith M as the catalyst substrate, the invention is not restricted thereto but is applicable to various uses providing that the slurry is coated to the inner walls of a plurality of flow channels formed in parallel with each other to a substrate.

As has been described above according to the invention, since the slurry is caused to flow into each of the flow channels after the liquid surface of the slurry supplied in the slurry storing part is levelled, it can provide an excellent effect that a slurry of an identical amount flows into each of the flow channels and the slurry can coat uniformly for the identical length in each of the channels and also provide an excellent effect of not resulting in the wasteful loss of the slurry even in a case of coating the slurry over the entire length of the flow channels.

INDUSTRIAL APPLICABILITY

The invention can be applied to the use of spreading a slurry in a plurality of the channels formed in parallel with each other to a substrate and coating the inner wall of the flow channels and this is particularly suitable to the application use of forming a catalyst by coating a catalyst slurry to the inner wall of honeycomb channels formed in the monolith as a catalyst substrate for an exhaust gas purifying catalyst.

DESCRIPTION FOR REFERENCES

Figure 1:
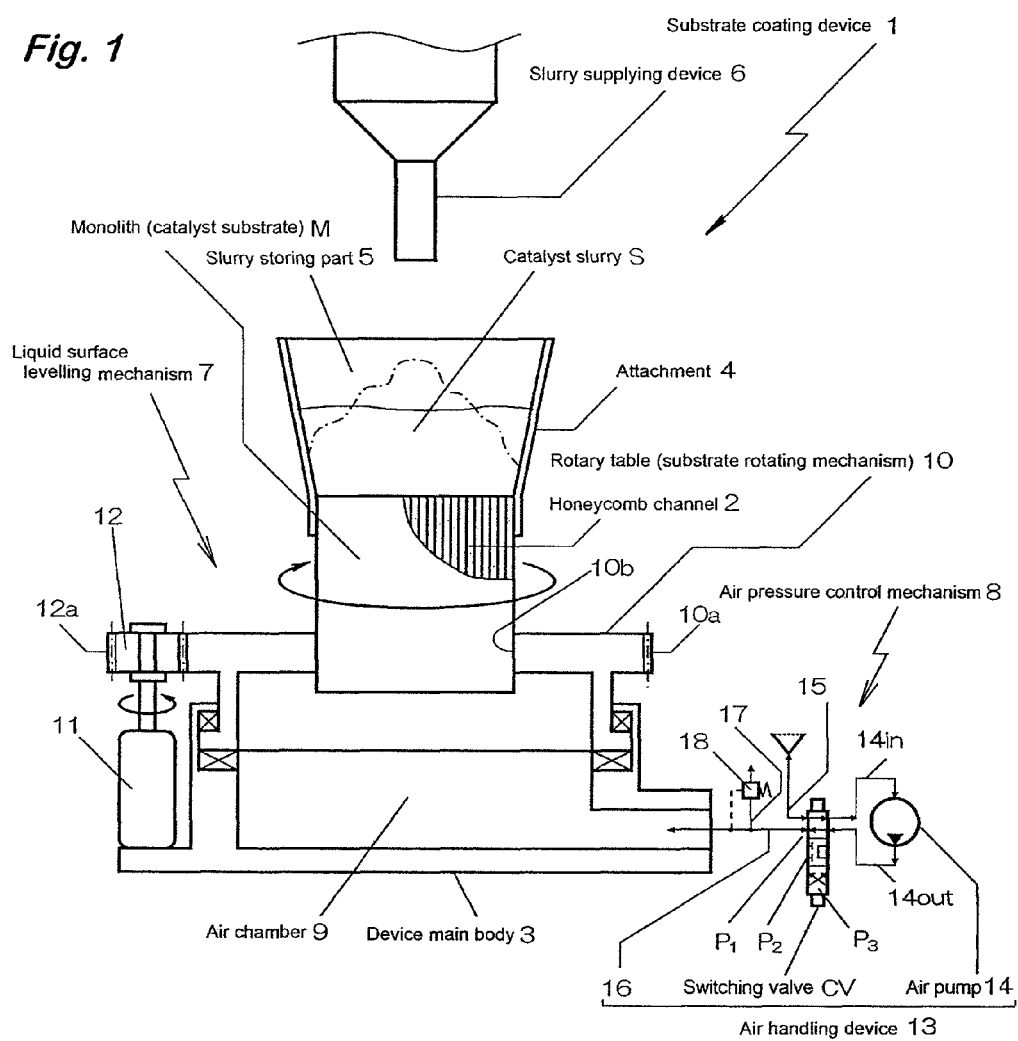
FIG. 1 is an explanatory view showing an example of a substrate coating device according to the invention.
Figure 2A:
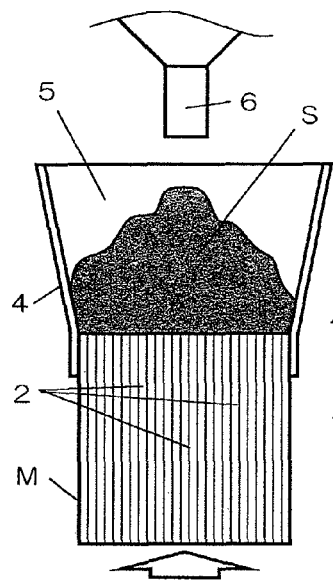
FIG. 2 is an explanatory view showing an example of a substrate coating method according to the invention.
Figure 2B:
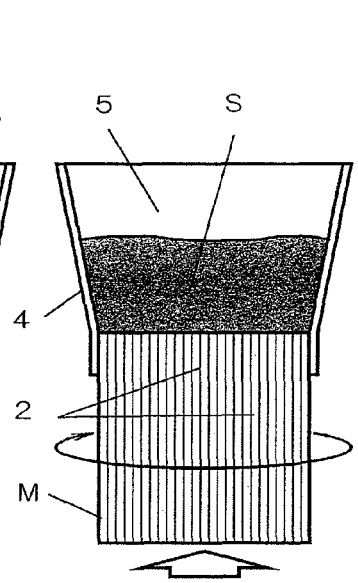
Figure 2C:
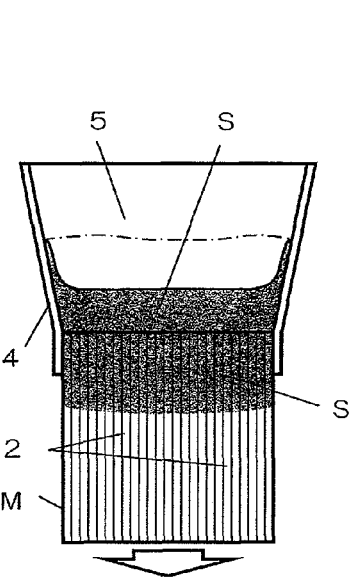
Figure 2D:
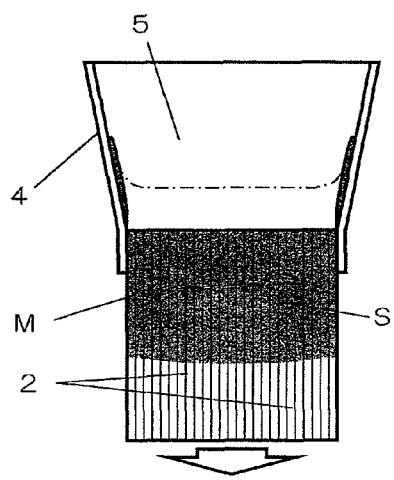
Figure 2E:
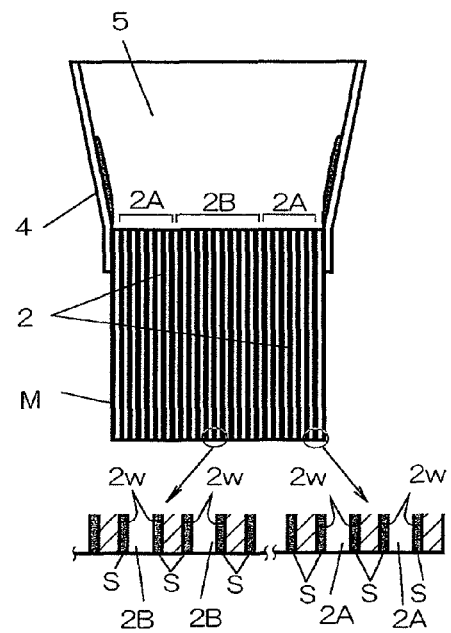
Figure 3:
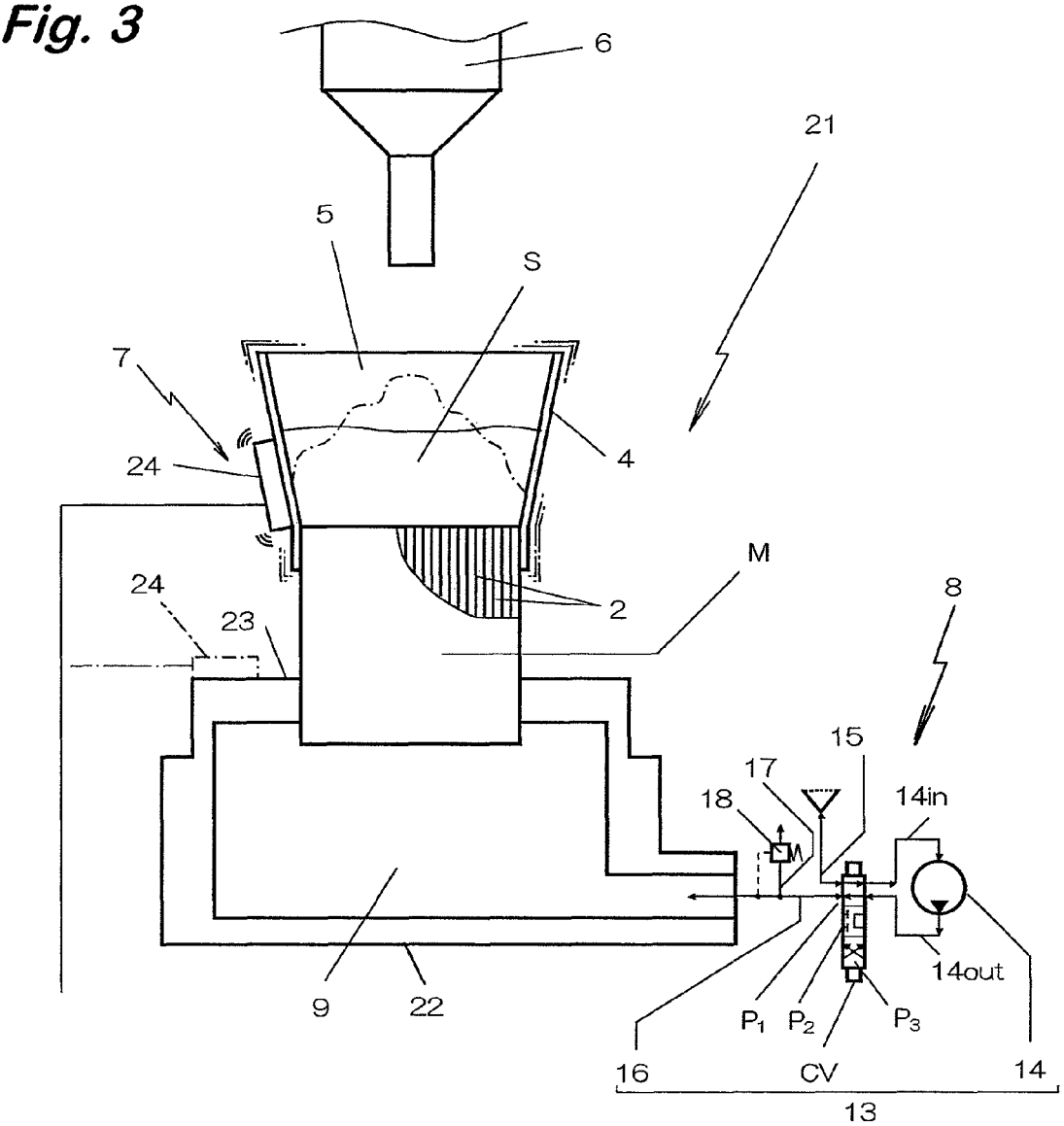
FIG. 3 is an explanatory view showing another embodiment.
Figure 4:
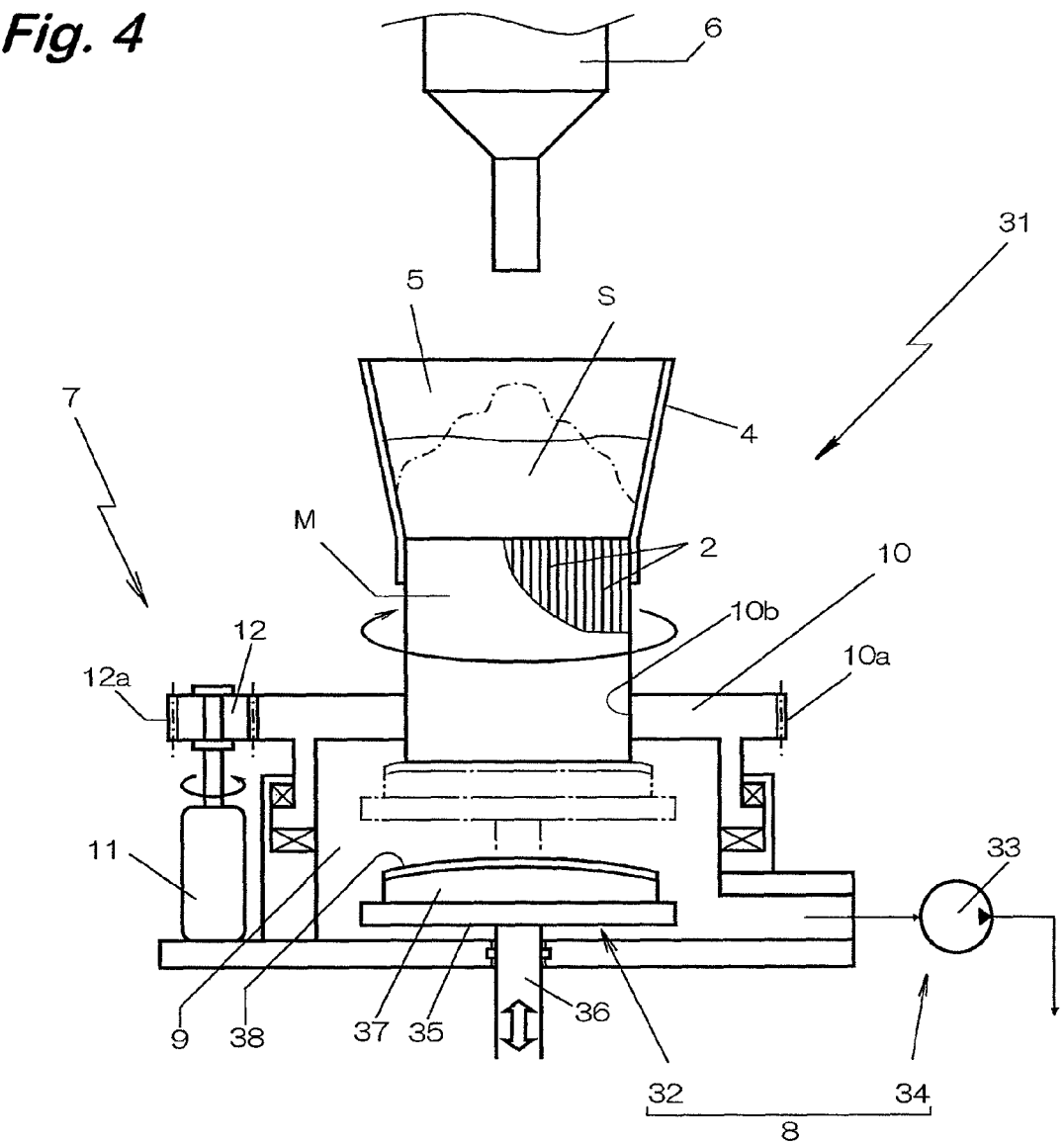
FIG. 4 is an explanatory view showing a further embodiment.
Figure 5:
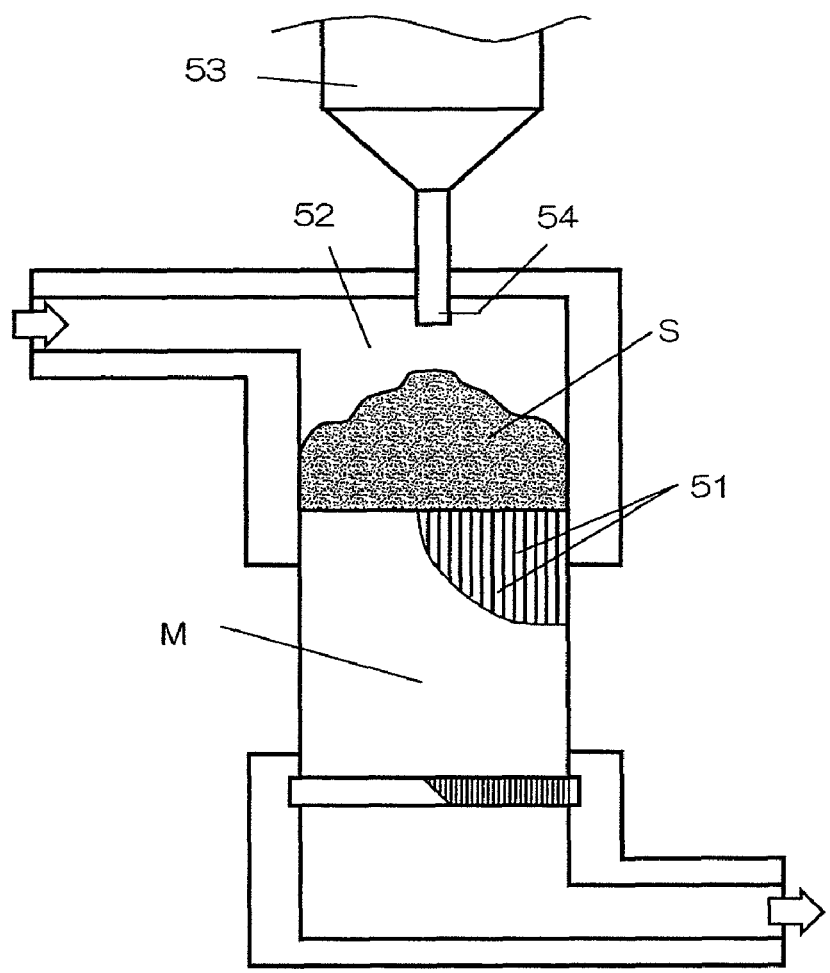
FIG. 5 is an explanatory view showing an existent device.
Figure 6A:
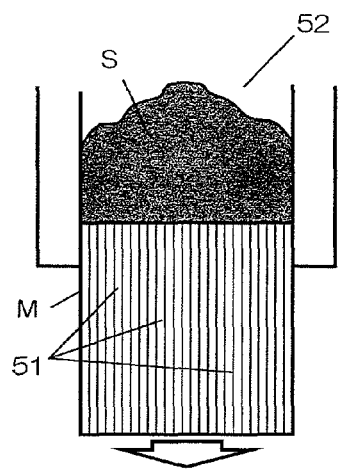
FIG. 6 is an explanatory view showing an existent method.
Figure 6B:
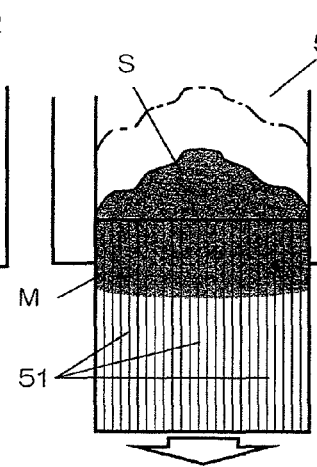
Figure 6C:
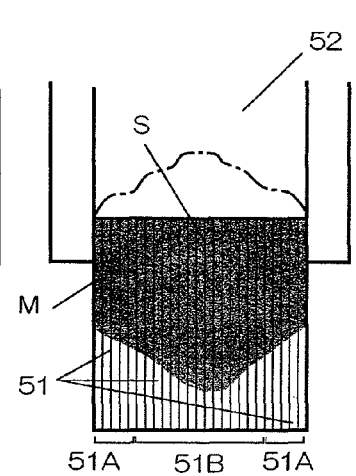
Figure 6D:
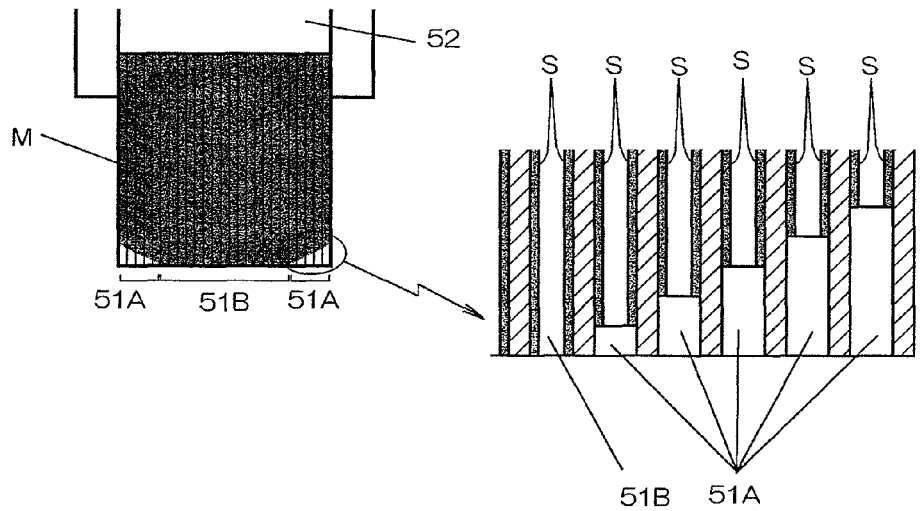

1 Substrate coating device
M Monolith (catalyst substrate)
S Catalyst slurry
2 Honeycomb channel
2w Channel inner wall

3 Device main body
4 Attachment
5 Slurry storing part
6 Slurry supplying device
7 Liquid surface levelling mechanism
8 Air pressure control mechanism
9 Air chamber
10 Rotary table (substrate rotating mechanism)
13 Air handling device

The invention claimed is:

1. A substrate coater for spreading a slurry supplied on one side of a substrate formed with a plurality of flow channels in parallel with each other into the flow channels by an air pressure thereby coating the inner wall of the flow channels, the substrate coater comprising:

a slurry supplier that supplies a slurry by a necessary amount to a slurry storing part formed above the upper surface of a substrate disposed such that ends of the channels are opened to the upper surface and the bottom surface, respectively, an air chamber supporting the substrate, and a liquid surface leveler that makes the slurry liquid surface uniform before spreading the slurry in the flow channels, in which the liquid surface leveler comprises a rotary table having a hole that penetrates through both the upper and lower surfaces of the rotary table so as to allow passage of the substrate through the rotary table, the hole configured to allow the substrate to be fitted within the hole so as not to cover the flow channels and such that the flow channels of the substrate are opened at upper end of the substrate to an outside of the air chamber and opened at a lower end of the substrate into an inside of the air chamber, the rotary table rotating the substrate and slurry storing part around a vertical axis passing therethrough to level the liquid surface of the slurry by utilizing a centrifugal force by rotation in a state of storing the slurry in the slurry storing part.

2. The substrate coater according to claim 1, having an air pressure controller that controls a force of the slurry tending to flow from the slurry storing part into each of the flow channels and an air pressure in the channels to switch the inhibition of inflow and spreading of the slurry in the flow channels.

3. The substrate coater according to claim 2, wherein the air pressure controller is defined by an air handler that supplies/sucks air within the air chamber on the side of the bottom of the substrate to exert a positive pressure and/or negative pressure in each of the flow channels.

4. The substrate coater according to claim 2, wherein the air pressure controller is defined by an air handler having a detachable packing that seals the opening of the channels on the side of the bottom of the substrate, wherein the air handler sucks air within the air chamber and/or supplies a pressurized air on the side of the liquid surface of the slurry storing part when opening the packing.

* * * * *